UNITED STATES PATENT OFFICE.

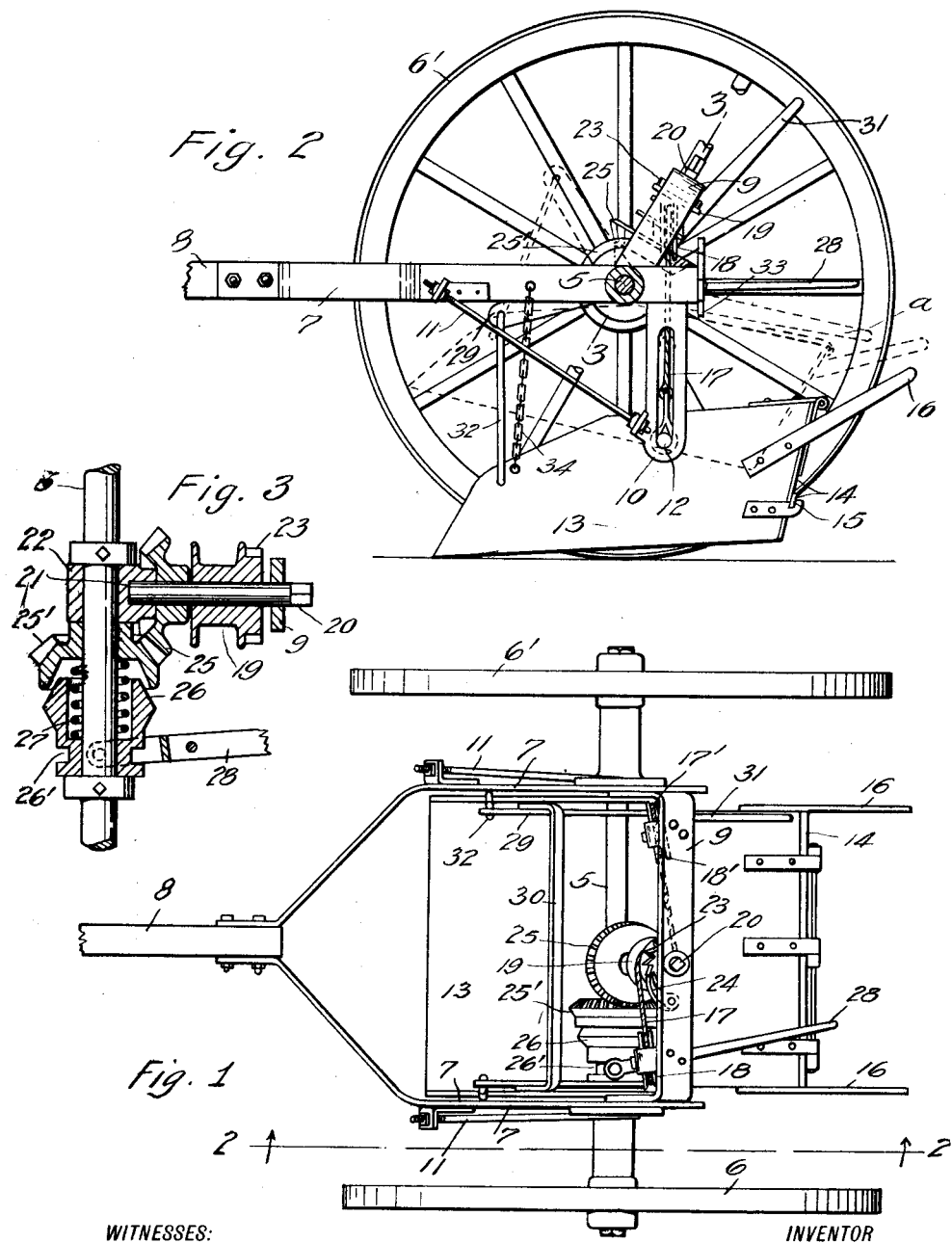

NORMAN L. GOODWIN, OF TACOMA, WASHINGTON.

SELF-LOADING CART.

1,086,816.  Specification of Letters Patent.  Patented Feb. 10, 1914.

Application filed February 28, 1912. Serial No. 680,549.

*To all whom it may concern:*

Be it known that I, NORMAN L. GOODWIN, a citizen of the United States, residing at Tacoma, in the county of Pierce and State of Washington, have invented certain new and useful Improvements in Self-Loading Carts, of which the following is a specification.

This invention relates to that class of wheeled excavating appliances known as self-loading carts, and more particularly to improvements in the devices of this character which are illustrated and described in United States Patent No. 987,621, issued to me March 21, 1911.

The object of my improvement is the perfecting of the scraper-pan elevating and lowering devices whereby the operations of the same are facilitated.

The invention is illustrated in the accompanying drawings, wherein—

Figure 1 is a plan view; Fig. 2 is a longitudinal section through 2—2 of Fig. 1; and Fig. 3 is a detail sectional view through 3—3 of Fig. 2.

The reference numeral 5 designates an axle for a pair of vehicle wheels 6 and 6', one of which is loosely journaled thereon and the other, 6, is fixedly secured to the axle so that the latter will be rotated with such wheel. Connected to said axle are spaced frame members 7 which are secured to a pole 8 to which a team of horses is attached. Formed with or rigidly secured to the rear ends of said frame members is a transversely arranged member 9. Depending from and rigidly secured to the frame members 8 are hanger elements 10 which are also advantageously connected from near their lower ends with the members 7 by diagonal braces 11. Said hanger elements are slotted to afford guides for trunnions 12 provided at the opposite sides of a scraper body 13 and preferably to the rear of the center of gravity of the body. As illustrated, said body is provided at its rear with a hinged door 14 which may be fastened in its closed condition by a latch 15. Handle arms 16 are provided on the body to enable the operator to control the same, as usual when loading.

Connected to the trunnions 12 are flexible lines 17 and 17' which are led about guide and supporting sheaves 18 and 18' to a winding drum 19. This drum is fixedly mounted upon a stub shaft 20 having one end journaled in a bearing provided in the frame member 9 and the other end journaled in a step bearing 21 (Fig. 3) provided in a sleeve 22 through which said axle extends. Integral with said drum is a ratchet wheel 23 and for which is provided a pawl 24 pivotally connected to the frame member 9, as shown in Fig. 1. Also fixedly mounted upon the shaft 20 is a toothed bevel gear wheel 25 in continuous mesh with a gear wheel 25' which is mounted upon the axle so as to allow the latter to rotate freely therein. The gear wheel 25' is formed to constitute an element of a clutch coupling having the complementary element 26 splined to the axle for axial movements only. As illustrated, said coupling is of the type known as cup-couplings though any other suitable coupling may be used instead. Interposed between the clutch elements is a helical spring 27 which acts to yieldingly retain the clutch element 26 in its disengaged position.

28 represents a forked lever engaging the coupling element 26 in an annular groove 26' provided therein and is employed to effect the engagement of the clutch parts in opposition to said spring when motion is to be transmitted from the axle 5 to the drum 19 when it is desired to accomplish the elevation of the scraper body 13.

29 represent companion lever-arms which are fulcrumed to and extend forwardly from the axle 5. The lever arms are integrally connected by a transverse bar 30 and are operated by a lever arm 31 which is formed with or rigidly secured to one of the arms 29. Links 32 connect the arms 29 with the sides of the scraper body in proximity to their forward ends and serve to support the forward end of the scraper when the lever arm 31 is swung rearwardly into the position in which it is indicated by broken lines *a*, Fig. 2, whereat the lever arm is caught by a hook 33 attached to the frame.

34 represent chains connecting the frame with the body to limit the downward tilting of the forward end of the body when dirt is being scooped by the scraper in its forward travel.

The operation of the invention is as follows: When the machine is drawn forward by the horses, the traction wheels are caused to roll upon the ground, and, in so doing, the rotary motion of the wheel 6 is transmitted through the medium of the axle 5 to the clutch element 26. By means of the forked lever 28, the element 26 is shifted in to couple with the element 25 whence the shaft 20 is driven to effect the rotation of the drum 19 to wind the lines 17 and 17' thereabout and accordingly elevate the body 13. When the body is to be lowered the operator first disengages the pawl 24 and then releases the lever 28; the spring 27 then asserts its power to separate the clutch elements, and the body being unsupported by the lines descends to its lowermost position. When the body is thus lowered it may be loaded by the operator manipulating the handle arms 16 while the machine is drawn forward. After being loaded, the body is elevated, as above described; its front end is tilted up by means of the lever arm 31, when the various parts will occupy the position in which they are indicated by broken lines in Fig. 2. By unlatching the door the load is discharged from the rear end.

In the present invention the scraper body may be raised by and during a relatively small forward travel of the vehicle; the lowering of the body being attained through the weight of the body and its load and may obviously be accomplished when the vehicle is at rest, thus allowing the cart to operate in situations otherwise unattainable.

What I claim, is—

In a device of the class described, an axle provided with a pair of traction wheels, a frame supported by said axle, an auxiliary frame carried thereby, a sleeve member having a socket formed therein loosely mounted on said axle, a stub shaft journaled between the auxiliary frame and sleeve extending in a direction at right angles to the axle, a winding drum and gear fixed thereon, a gear forming one element of a clutch loosely mounted on said axle adjacent the sleeve member and in continuous engagement with the gear on said stub axle, a spring retracted clutch element splined on said axle and adapted to be shifted to engage the clutch gear to cause the drum to be operable.

Signed at Seattle, Wash., this 17th day of Feb., 1912.

NORMAN L. GOODWIN.

Witnesses:
 PIERRE BARNES,
 MYRTLE GOODWIN.